Aug. 14, 1962 W. G. KLOSTER 3,048,904
ADJUSTING PIN
Filed March 16, 1960 2 Sheets-Sheet 1
FIG. 1
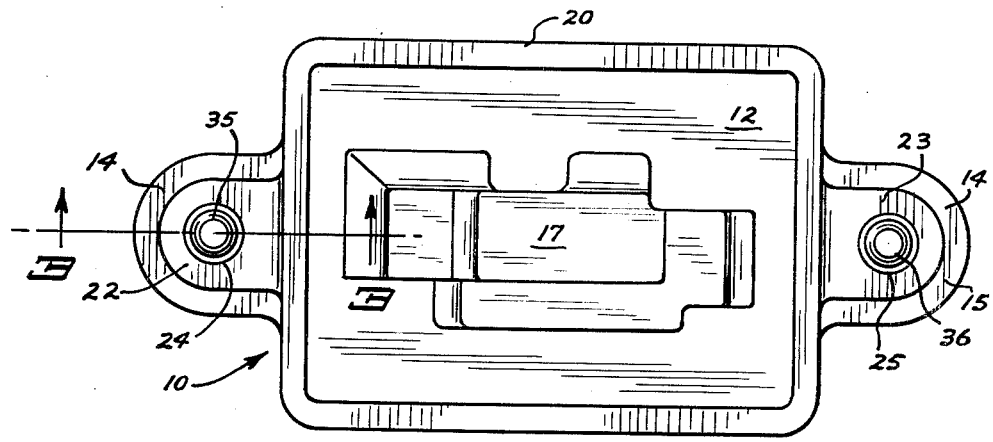
FIG. 2
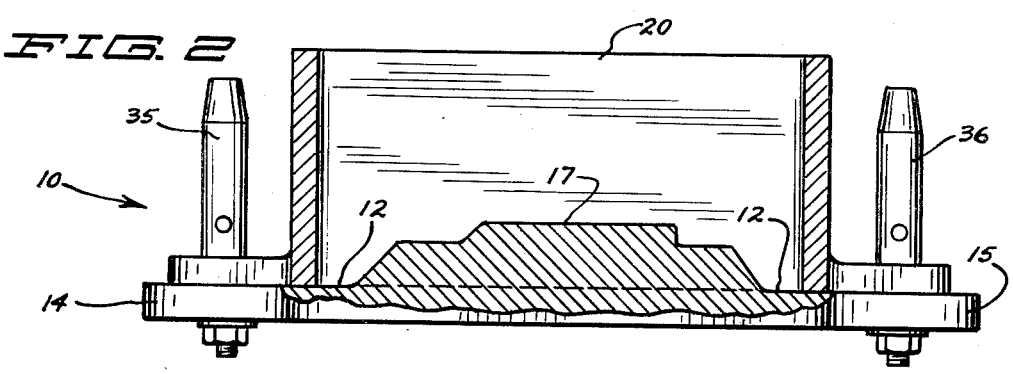
FIG. 3
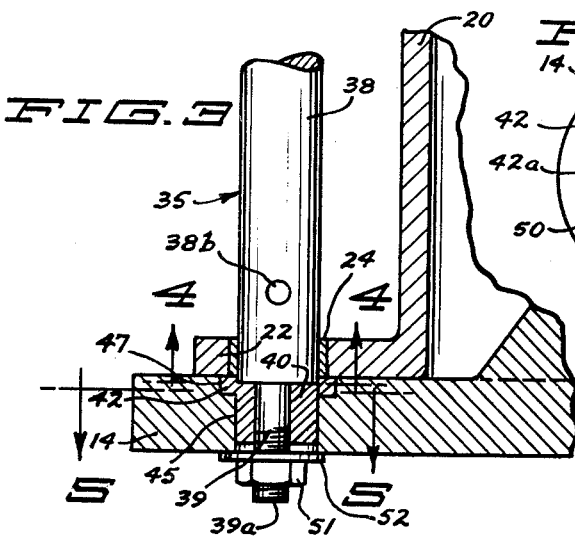
FIG. 4
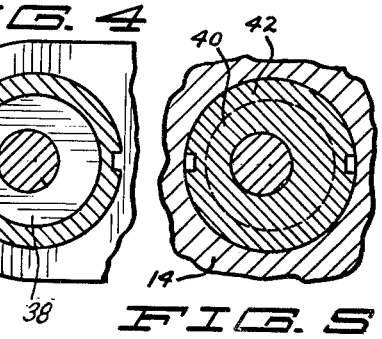
FIG. 5
INVENTOR.
WILLIAM G. KLOSTER
BY Rei and Gregory
ATTORNEYS Aug. 14, 1962   W. G. KLOSTER   3,048,904
ADJUSTING PIN
Filed March 16, 1960   2 Sheets-Sheet 2
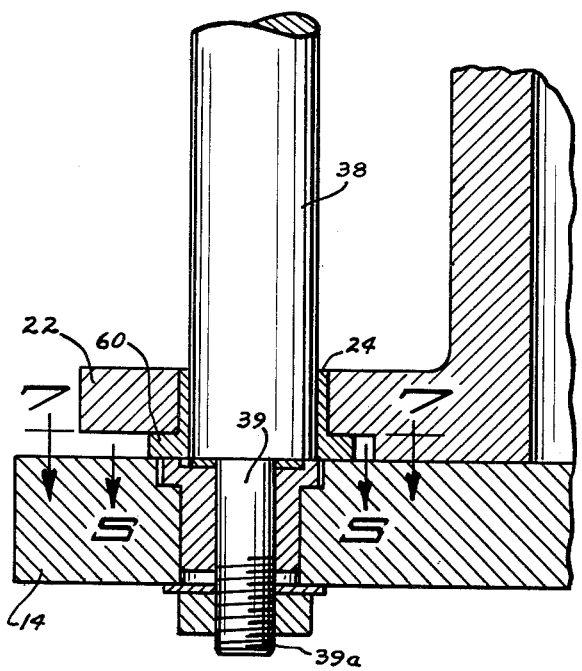
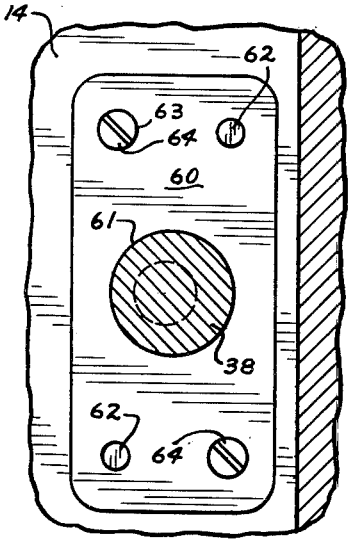
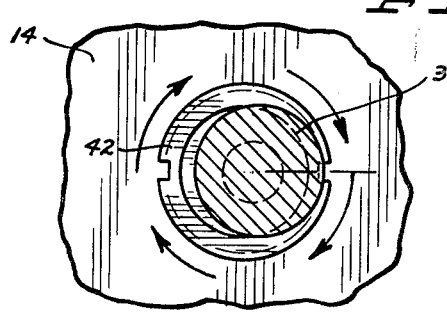
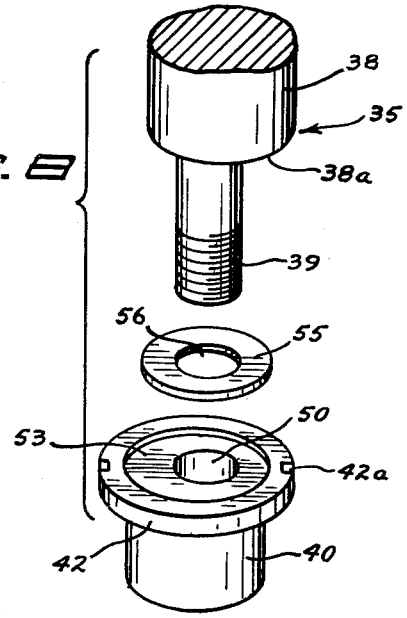
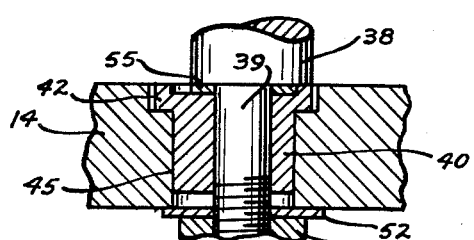
INVENTOR.
WILLIAM G. KLOSTER
BY Reif and Gregory
ATTORNEYS

United States Patent Office 3,048,904
Patented Aug. 14, 1962

3,048,904
ADJUSTING PIN
William G. Kloster, 2839 11th Ave. S.,
Minneapolis, Minn.
Filed Mar. 16, 1960, Ser. No. 15,315
2 Claims. (Cl. 22—110)

This invention relates to an improvement in an adjusting pin for use in connection with cope and drag patterns and plates.

The cope pattern and plate will be provided with pins to be disposed through the bushings in a cope flask in position for the forming of a mold. Where a variance occurs between the matchup of the mold portions in the cope and drag flasks, there apparently is no efficient and accurate means for adjusting the position of the cope pattern and plate in relation to the cope flask to provide for an accurate matchup of said mold portions. Even where the initial position for the pins in the cope pattern and plate is carefully determined, there may be some variance resulting as from some travel of a drill in boring the pin holes in said cope plate.

Where close tolerance is required for accurately forming a casting by the method of using cope and drag patterns and plates, a minute difference is critical in the matchup of the mating mold portions. Differences ranging from 1/64 to 1/4 of an inch, and sometimes even up to 1/2 of an inch, are not uncommon. Various makeshift means are presently used for adjusting the positions of the pins in the cope pattern and plate, such as enlarging the bore of the pin hole at one side and placing a bushing at the other side thereof to force a pin to a new position, and methods even as crude as just pounding a pin to one side are used.

It is an object of this invention therefore to provide means for making certain specific adjustments in the location of a pin in a cope pattern and plate for an accurate matchup of the cope and drag mold portions.

It is a further object of this invention to provide a pin for location in certain different positions as may be necessary in a cope pattern and plate to locate said pattern and plate in a certain position in relation to the cope flask with which it is used.

It is another object of this invention to provide in connection with a cope pattern and plate a pin assembly for joining said plate to a cope flask in a certain relation therewith comprising means for installing said pin as a straight true centered pin, and means for adapting said pin for a double eccentric rotative adjustment for maximum adjustment of said plate to said flask in any certain direction circumferentially about the true center location of said pin or for any lesser degree of adjustment as may be desired.

It is a more specific object of this invention to provide a pin assembly for use in connection with a cope pattern and plate comprising a bushing disposable in the bore of a flange of a cope pattern and plate with said bushing having an eccentric bore therethrough, a counter-bore in said bushing, a pin having a shank portion eccentric to the shaft thereof whereby said shank may be disposed in said bushing and said shaft seated in said counter-bore in a certain circumferential position in relation thereto whereby said shaft is axially alined with said bore in said flange, and means in operative association with said bushing and said pin for adjustably positioning said pin in certain different positions circumferentially of the vertical extension of the axis of the bore of said flange by rotative movement of said pin with said adjustment resulting from the operative relationship between the eccentric bore in said bushing and the eccentric shank of said pin.

It is also an object of this invention in connection with said pin, as set forth in the previous object, to provide means for locking said pin in position once its desired position has been determined.

These and other objects and advantages of the invention will be fully set forth in the following description made in connection with the accompanying drawings in which like reference characters refer to similar parts throughout the several views and in which:

FIG. 1 is a top plan view of a cope and pattern plate in position in connection with a cope flask;

FIG. 2 is a view similar to that shown in FIG. 1 in side elevation with a portion thereof being broken away and shown in vertical section;

FIG. 3 is a fragmentary view in vertical section taken on line 3—3 of FIG. 1, as indicated by the arrows;

FIG. 4 is a fragmentary view in horizontal section taken on line 4—4 of FIG. 3, as indicated by the arrows;

FIG. 5 is a fragmentary view in horizontal section taken on line 5—5 of FIG. 3, as indicated by the arrows;

FIG. 6 is a view similar to that shown in FIG. 3 with a portion of applicant's device shown in a different position;

FIG. 7 is a fragmentary view in horizontal section taken on line 7—7 of FIG. 6, as indicated by the arrows;

FIG. 8 is an exploded view of a portion of applicant's device on an enlarged scale with a portion thereof being broken away;

FIG. 9 is a fragmentary top plan view of applicant's shaft structure in an extreme eccentric position; and FIG. 10 is similar to the view shown in FIG. 9 in vertical section.

Referring to the drawings, and especially to FIGS. 1 and 2, a cope pattern and plate 10 is shown comprising a plate 12 indicated here as being substantially rectangular in form and having at either end thereof flanges 14 and 15 shown to be ear-like in form and having integral therewith at one side thereof a cope portion of a pattern 17. Said cope pattern and plate 10 is here shown in operating position with a cope portion of a flask 20. Said flask is here indicated as being substantially parallelepiped in form. Said cope flask has flanges 22 and 23 extending outwardly at either end thereof adapted to extend over said flanges 14 and 15 respectively and being respectively provided with cylindrical bushings 24 and 25, and extending therethrough are pins 35 and 36 upstanding respectively from flanges 14 and 15, and said pins will be hereinafter described in detail.

In connection with a cope pattern and plate there is used a drag pattern and plate bearing the other portion of the pattern. The drag pattern and the plate is used in connection with a drag flask for forming a mold therein, and this portion of the mold in the drag flask after the removal of the drag pattern and plate is matched up with the mold in the cope flask. The mold in the cope flask is formed in connection with the cope pattern and plate as above indicated.

The use of cope and drag pattern and plate equipment is well known in the art. The applicant's invention has to do with the pin assembly indicated here as being used in connection with the cope pattern and plate in its association with a cope flask. Applicant's invention is not limited to this application and may have other wide usage. In making an adjustment of the pattern and plate equipment for a perfect matchup of the cope and drag mold portions when there is a variance in the matchup, it is common for the cope pattern and plate to be shifted in its relation to the cope flask to offset such variance and provide for a perfect matchup. This is done by changing the positions, however slight, of the pins in the cope pattern and plate.

A perfect matchup of mold portions may require the forming of several castings to determine the variance and when a perfect casting is formed, the position of the cope pattern and plate in relation to the cope flask is then fixed, as will be hereinafter described. Applicant's invention is directly concerned with the adjustability of the pins in the cope pattern and plate for making the necessary adjustment of such pattern and plate in relation to the cope flask to provide a perfect matchup with the drag portion of the mold. There being no unusual features involved in the drag portion of the pattern and plate or flask, these are not here shown, as it is believed that such a showing is not necessary to a full understanding of the applicant's invention, and the use of these parts is well known to anyone skilled in the art.

Where adjustment is required in the positioning of the pin or pins in the cope pattern and plate, generally various makeshift means are used. The applicant provides a pin assembly which makes it possible to use the pin as a true centered pin in relation to the bore of the flange in which it is secured or to position it at a maximum adjustment in any certain position circumferentially thereabout or throughout a full circle by the presence of a double eccentric combination of elements.

Referrings to FIGS. 3–5, applicant's pin assembly is disclosed in operative position showing applicant's pin 35 in a true centered position comprising a bushing 40 having an annular collar 42 thereabout at its upper portion disposed in a bore 45 in the flange 14 of the cope pattern and plate 10. Said bore 45 has a counter-bore 47 therein respectively to accommodate said bushing 40 and its collar 42. As here shown, the axis of the pin 35 is coincidental with the axis of the bore 45. Said bushing 40 has oppositely located detents 42a in the peripheral surface of its collar portion 42 for manipulation of the same by a suitable tool. The bore 50 of the bushing 40 is eccentric to the axis of said bushing and eccentric to the axis of said bore 45.

Adapted to be disposed in said bushing 40 is said pin 35 comprising a shaft 38 and a shank 39 with a shoulder 38a formed therebetween. The lower end of said shank has a threaded portion 39a, and adapted to be threaded thereon is a lock nut 51 equipped with a lock washer 52.

As shown in FIG. 3, said shank 39 is eccentric to said shaft 38. The eccentricity of said shank 39 in its relation to said shaft 38 is complementary to the eccentricity of a counterbore 53 in its relation to said bore 50. Said counter-bore 53 is formed within said collar 42 and said shaft is formed having a diameter to nicely fit into said counter-bore whereby when said shaft 38 is seated in said counter-bore 53, the axis of said shaft will be coincidental with the axis of said bore 45 and said pin may thus be said to be located in a true centered position. When in said centered position said shaft is locked against rotative movement as circumferentially there is only one certain position in which said shaft may be seated in said counter-bore and have said shank 39 disposed in said bore 50.

Oppositely spaced detents 38b are formed in said shaft 38 for easy rotation of the shaft by a suitable tool.

Applicant's pin assembly, as above described, is in a locked position for use where no variance in the matchup of the cope and drag mold portions is present as a result of the initial location of the pins 35 and 36 in the cope pattern and plate. This perfect positioning is possible but it is not common. It is common for a variance to be present in the matchup of the cope and drag mold portions at the outset. With the presence of a variance the location of either or both pins 35 and 36 will have to be changed to change the position of the cope pattern and plate relative to its initial position in its operative relation to the cope flask 20. Although adjustment of both pins 35 and 36 may be required, only pin 35 will be considered in detail as both pins will have identical construction.

With reference to FIGS. 6, 8–10, an exploded view is shown of the bushing 40 structure including the collar 42 and the counter-bore 53 therein. Adapted to be disposed in said counter-bore 53 is a washer 55 having a bore 56 therein concentric with said bore 50 when said washer is seated in said counter-bore 53. When thus seated, said washer 55 will be flush with the top surface of said collar 42.

Said washer 55 is a critical element in giving the pin 35 a wide range of adjustability from its true center position as above indicated to a full circumferential adjustment of the maximum extent of the double eccentric formed by the bore 50 in its relation to the shaft 38. With said washer 55 seated in said bushing 40, the shaft 38 of pin 35 will then ride on the surface of said washer and shank 39 will be disposed through the bore 50, as shown in FIG. 6. Said shaft in being eccentric to said bore 50 can be adjustably positioned thereabout to certain different positions throughout a full interval of 360 degrees. Further in being positioned for a maximum adjustment relative to the bushing 40 with said bushing being in one position, said bushing may be rotated to provide for said maximum adjustment throughout said full interval of 360 degrees and the same is true of a minimum adjustment or any certain adjustment between these two extremes. Being adapted for making any certain adjustment throughout a full interval of 360 degrees gives applicant's pin assembly wide adjustability and this represents a substantial advance in the art. In the exploded view of FIG. 8, a maximum adjustment relation is indicated between the position of the shaft 38 and the rotative position of the bushing 40.

With continued reference to FIG. 8 and to FIGS. 9 and 10, when said pin 35 has been correctly positioned for a perfect matchup between the mold portion in the cope flask and the one formed in the drag flask, then said pin 35 is locked in said position by a locking plate 60.

As here disclosed, with reference to FIG. 7, said locking plate is shown to be substantially rectangular in plan having a bore 61 therein to nicely accommodate said shaft 38 and having spaced therein a pair of diagonally opposed dowel holes 62 and a pair of diagonally opposed screw holes 63, with screws 64 being shown within said holes 63 for securing said plate to said flange 14. Said flange will be bored to have tapped holes to receive said screws 64 and/or holes to receive dowels, if used, as the case may be. Other suitable means may be used for securing said plate in position. Thus said plate 60 holds said pin 35 locked against eccentric rotative movement, and the cope pattern and plate 10 will be perfectly positioned in its relation to said cope flask 20 for forming a cope portion of a mold to perfectly match the drag portion thereof.

Thus it is shown that I have disclosed a very simple construction for very accurately and definitely positioning the pins in a cope pattern and plate and locking the same in place for perfectly forming a cope portion of a mold in connection with a cope flask.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. An adjusting pin of the class indicated comprising a bushing having an eccentric bore therethrough,
   an annular collar about one end of said bushing having a counter-bore therein concentric with the axis of said bushing,
   a pin having an upper shaft portion of the diameter of said counter-bore and a lower shank portion of the diameter of said bore, and
   said shank being eccentric to said shaft in the same degree that said bore is eccentric to said bushing with said pin being disposed through said bushing and said shaft being received within said counter-bore and locked therein against rotative movement concentric with said bushing.

2. The structure set forth in claim 1, including a washer disposed in said counter-bore flush with the surface thereof and underlying said shaft and having a bore in alignment with said bore of said bushing whereby said shaft and said bushing are respectively movable through separate eccentric paths relative to one another for a doubled eccentric action relative to one another.

References Cited in the file of this patent

UNITED STATES PATENTS

| | | |
|---|---|---|
| 457,088 | Montgomery | May 17, 1892 |
| 925,687 | Danver | June 22, 1909 |
| 1,367,602 | Cannon | May 3, 1921 |
| 1,660,966 | Hasey | Feb. 28, 1928 |